July 10, 1956     G. F. WITTGENSTEIN     2,753,819
SEED-SOWING MACHINES
Filed Sept. 17, 1952     2 Sheets-Sheet 1

Inventor:
Gerard Francis Wittgenstein
by [signature]
Attorney

July 10, 1956 G. F. WITTGENSTEIN 2,753,819
SEED-SOWING MACHINES
Filed Sept. 17, 1952 2 Sheets-Sheet 2
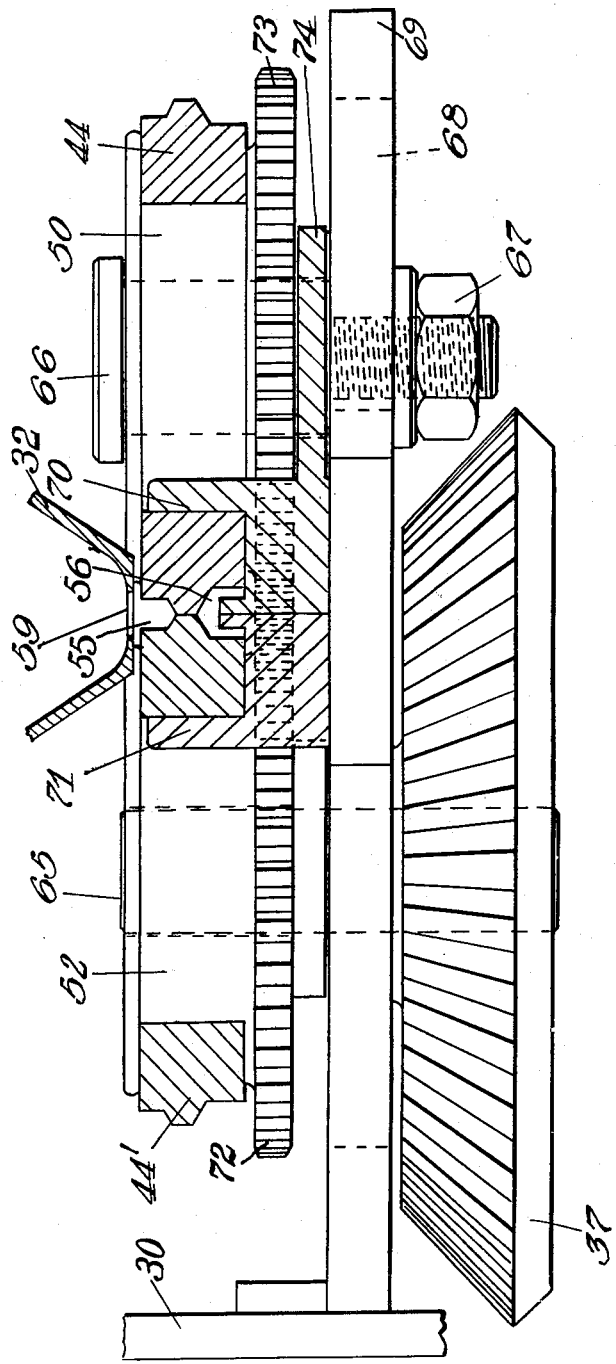
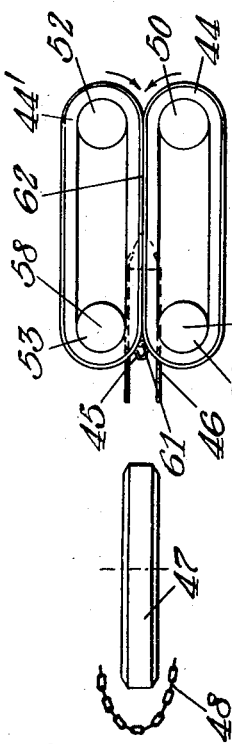
Inventor:
Gerard Francis Wittgenstein
by
Attorney

United States Patent Office 2,753,819
Patented July 10, 1956

2,753,819

SEED-SOWING MACHINES

Gerard F. Wittgenstein, Lausanne, Switzerland

Application September 17, 1952, Serial No. 309,990

Claims priority, application Switzerland October 15, 1951

9 Claims. (Cl. 111—71)

The present invention relates to a seed-sowing machine which sows one by one seeds of any forms and dimensions, and more especially the seeds known as monogerms, coated or not coated, of the sugar beet, cotton seeds, ground nuts, coated or not coated, maize, wheat, colza, peas, horticulture seeds, etc.

For sowing such seeds use has in general been made of distributors the cells of which are approximately of the same dimension as the seed in question. Such sowers have a defective filling. Moreover their cells often admit to each cell two or even more small seeds. These additional seeds create an irregularity in the sowing, or else, on leaving the hopper, are jammed against the rear wall of the cell and crushed, thus quickly fouling the distributor and increasing the original irregularities. From this arrangement numerous duplications occur, and crushed seeds do not germinate well. Furthermore known sowers require a seed extirpating device, usually a simple stationary or spring blade, which is liable to injure the seed and thus increase the crushing, while the germinating power is diminished by the injury. Moreover these extirpators, by retarding the extirpated seed, upset the regularity of the sowing. Finally the sowing of known distributors is not visible, so that if for any reason the distributor becomes choked, the apparatus ceases, without the farmer's knowledge, to supply seeds, and the field is not sown. The object of the present invention is to remedy these serious disadvantages.

It relates to a sower the distributor of which is constituted by at least two flexible endless bands, actuated by a supporting wheel of the sower, not provided with cells, but provided with at least one channel, which gathers the seeds while passing beneath a hopper and carries them out of the latter. In the channel the seeds form a continuous chain. At a point called the liberation point, where the movement of the bands undergoes a change of direction, for instance on passing round drums, the seeds, being deprived of their support, fall to the ground and are sown.

The two bands of which the conveyor consists are each actuated by a drum. Over one part of their path the two bands travel side by side at the same speed and form the channel. Then, in passing over their separate drums, the two bands diverge, which has the effect of liberating the seeds from the channel, whereupon they fall one by one, as they arrive at this point of divergence of the paths of the two bands. The planes of symmetry of the two bands are in the same plane, which is inclined to the horizontal, the point of liberation being higher than the collecting zone.

The two bands are continually coming together to constitute the conveyor before passing underneath the hopper to collect the seeds, and are then continually being separated further on in order to liberate them. The bands, by their upper surfaces, which are provided with a certain roughness, brush past the seeds of the lowest layer in the hopper, thereby promoting their fall into the channel, and the formation therein of an uninterrupted chain of seeds. The inner wall surfaces of the bands may be fluted.

When the channel charged with seeds emerges from the hopper, no immediate change of direction is imposed upon it. According to the invention the drum is located far enough away from the hopper for the loaded channel to present, between the point of emergence and the point of liberation, a straight section which is clearly visible. This visibility of the chain of seeds not only obviates the risk of failure to sow certain sections, but also renders it possible, by using a lantern to illuminate the chain, to work reliably at night.

The breadth of the channel is constant from the collecting zone to the point of liberation, but it may be advantageous to maintain the seeds firmly in the zone of the channel immediately preceding the roller. To this end it is possible, by construction, to impart to one at least of the bands an obliquity relative to the longitudinal axis of the channel, and this obliquity may be variable. In this way a channel in the form of a truncated cone is obtained, which is wider in the collecting zone than in the roller zone. It is also possible to guide at least one of the bands in such a way as to constrict the channel at the desired point. For the guiding of the bands, either a rail of suitable shape is used, or a lateral device acting upon at least one of the bands in the region of the constriction.

The transmission of motion from the carrying wheel (which may also have other functions) is effected by means known in themselves, such as a belt, a chain, or toothed gearing. Similarly the agitator in the interior of the hopper may be operated by a transmission derived from the main transmission.

It will be realised that the advance of the bands, and therefore the number of seeds sown, is proportional to the advance of the sower over the ground, the ratio of proportionality depending only upon the transmission ratio. By modifying the diameter of the pulleys, or the wheels of a toothed transmission, or by inserting a speed box in the latter, the spacing of the seeds sown can be controlled.

Other features of the invention will appear from the following description. The drawings that accompany the description illustrate by way of example some forms of construction of the invention. These drawings relate to one sower, but of course a number of sowers may be coupled together and attached behind a tractor for the purpose of sowing a number of rows.

Figure 3 is a view from above; and

Figure 4 is a section on Z—Z in Figure 1 on a larger scale.

Figure 1:
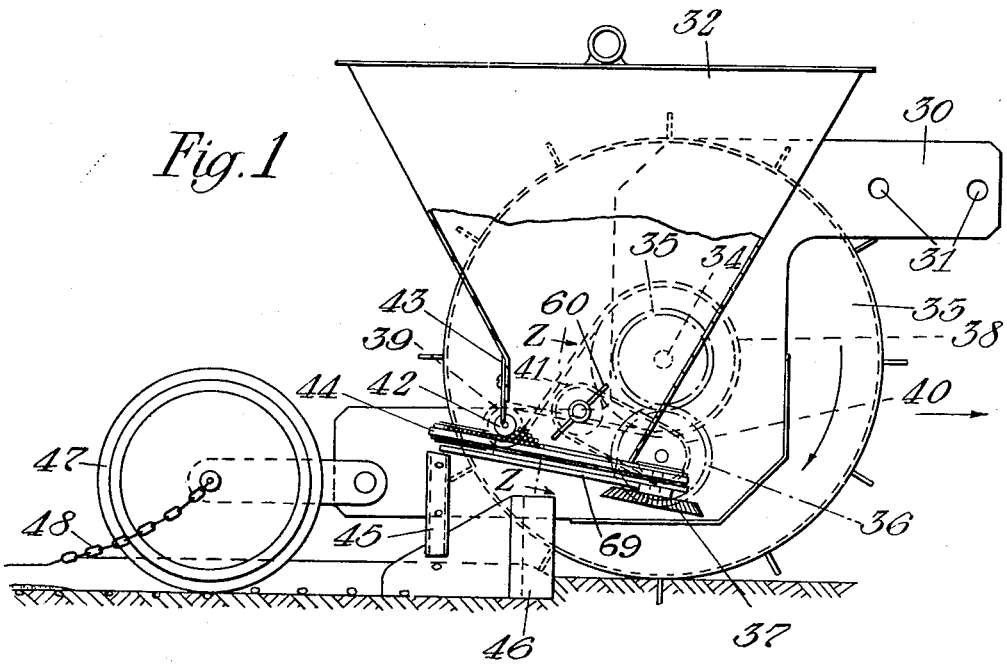
Figure 1 is a general profile view of a sower with two conveyor belts.
Figure 2:
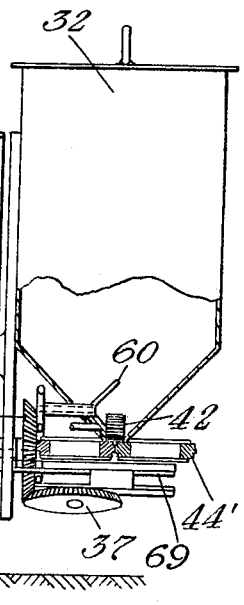
Figure 2 is an end view thereof.

Referring to Figures 1, 2, 3 and 4, 30 is the frame, 31 the coupling holes, 32 the hopper, 33 the supporting wheel, and 34 its axle. 35, 35', 36 and 37 form a toothed transmission system which controls the rotation of a driving drum 52. 38, and 39 are two pulleys which transmit, from the supporting wheel, the control of the rotation of the little knurled roller 42 that closes the outlet aperture of the hopper, while the rotation of the agitator 60 is controlled by the system of pulleys 40 and 41. It will be observed that the rotation of the little roller 42 is in a direction such that it impels the seeds towards the interior of the hopper. This roller is mounted on a bracket 43, the height of which is adjustable. 45 is the dropping tube, 46 the coulter, 47 the stamping wheel, and 48 the covering chain.

In this form of construction the conveyor consists of two bands 44 and 44', the driving drums of which are 50 and 52, and the other drums 51 and 53. It will be seen that the section of the bands is such that their juxtaposition gives rise to a channel 55, which will collect and transport the seeds. There will even be seen another channel 56, which may be of a different size from the channel 55, which renders it possible, by reversal, to use the bands for seeds of other dimensions. 59 is a longitudinal slot in the bottom of the hopper for the escape of seeds, this slot being located immediately above the seed-gathering channel, and 62 is the region of the channel where the seeds are collected beneath the hopper, while 61 is the region of liberation. 57 and 58 are the axes of rotation of the drums 51 and 53. When the breadth of the channel 55 is adjusted to its minimum value, the vertical wall of the band 44' bears against the corresponding wall of the band 44.

Referring more particularly to Figure 4, 44 and 44' are the two bands forming the channel 55 and the substitute channel 56. 37 is the bevel gearing, keyed, like the drum 52, to a shaft 65, journaled in a plate 69, which is rigidly secured to the machine frame 30. This drum 52 is provided with a ring of teeth 72 which drives the toothed ring 73 of the drum 50, which is mounted loose upon the shaft 66. The drums 51 and 53 are also mounted freely upon their shafts. 70 and 71 are two guide rails, but while the rail 71 is fixed to the plate 69, the rail 70 rests upon this plate. This guide 70 is provided with a shoe 74, which is slidable upon the support 69 for the purpose of modifying the breadth of the channel 55. The shoe 74 embraces the shaft 66, which is itself displaceable in an elongated hole 68 in the plate 69. A nut 67 is used to secure the shaft 66 in any selected position in the hole 68. A similar arrangement may be provided for the shaft of the drum 51 to enable it to be displaced in a slot in the supporting plate 69 and fixed by means of a nut. Owing to this arrangement the breadth of the channel 55 is adjustable. Also owing to this arrangement, when it is desired to turn the bands over for the purpose of using the channel 56, all that is necessary is to loosen the nut 67 and move the two bands away from one another in order to be able to reverse them.

Having both the drums 50 and 51 displaceable gives greater facility in regulating the spacing.

In order not to overload the drawing, the chain of seeds which does in fact occupy the channel 55, has not been shown.

I claim:

1. A seed-sowing machine, comprising: a machine frame, a wheel supporting the machine frame, a coulter, a supporting plate connected with the frame, two drums carried by the supporting plate, a first flexible endless band passing round the two drums and inclined upwards in the part approaching the point where the seeds are allowed to fall, a shoe displaceably carried by the machine frame, two further drums mounted on the said shoe, a second flexible endless band passing round these two further drums and having the same inclination as the first band, the two bands each being formed with a groove, and being so arranged that in a rectilinear portion of their travel the two grooves co-operate to form a seed-gathering channel, a seed hopper connected with the machine frame, the bottom of the seed hopper having the same inclination as the bands and being formed with a longitudinal slot located above the seed-gathering channel, means for transmitting motion from the supporting wheel for the positive driving of one drum of each band, the drums being so arranged that the bands diverge from one another when they turn away from the rectilinear portion to pass round their drums, thereby allowing the seeds to fall to the ground under the action of gravity, an agitator located in the seed hopper, and means for transmitting motion from the supporting wheel to the agitator.

2. A seed-sowing machine as claimed in claim 1, wherein the two-part bottom of the channel is of symmetrical cross section.

3. A seed-sowing machine as claimed in claim 1, wherein each conveyor band is formed with two grooves, so shaped and positioned as to enable two seed-gathering channels of different cross sections to be employed alternatively by inverting the bands.

4. A seed-sowing machine as claimed in claim 1, the bottom of the hopper being formed with a gap adjacent to the conveyor bands, and the machine further comprising a small knurled roller interposed in the said gap, means for rapidly rotating the said roller, and means for adjusting the height of the said roller above the seed-gathering channel.

5. A seed-sowing machine as claimed in claim 1, further comprising means for varying the ratio of transmission from the supporting wheel to the drums.

6. A seed-sowing machine as claimed in claim 1, the seed-gathering channel being of uniform cross section, each groove of the bands constituting one vertical side and part of the bottom of the channel, thus supporting the seeds without pinching them.

7. A seed-sowing machine as claimed in claim 1, further comprising means for modifying the breadth of the seed-gathering channel by displacing the shoe parallel to itself.

8. A seed-sowing machine as claimed in claim 1, the lower edge of the front wall of the hopper being positioned some distance to the rear of the point of liberation of the seeds.

9. A seed-sowing machine as claimed in claim 1, further comprising a small knurled roller arranged just above the seed-gathering channel at the place where this channel passes beneath the front wall of the hopper, and means for rapidly rotating the said roller.

References Cited in the file of this patent

UNITED STATES PATENTS

| | | |
|---|---|---|
| 277,488 | Husted | May 15, 1883 |
| 326,153 | Richards | Sept. 15, 1885 |
| 1,264,454 | Terrell | Apr. 30, 1918 |
| 1,991,137 | Case | Feb. 12, 1935 |
| 2,297,296 | Flintjer | Sept. 29, 1942 |
| 2,365,762 | Johns | Dec. 26, 1944 |

FOREIGN PATENTS

| | | |
|---|---|---|
| 14,724 | Great Britain | Mar. 17, 1910 |